United States Patent [19]

Gold

[11] Patent Number: 5,441,324

[45] Date of Patent: Aug. 15, 1995

[54] INDUSTRIAL VAN WITH INCREASED CARGO-CARRYING CAPACITY

[76] Inventor: Peter Gold, 389 Peninsula Blvd., Hempstead, N.Y. 11550

[21] Appl. No.: 402,857

[22] Filed: Mar. 13, 1995

[51] Int. Cl.⁶ .............................................. B60P 1/00
[52] U.S. Cl. ....................................... 296/26; 296/152; 108/44
[58] Field of Search ............... 296/26, 50, 165, 146.8, 296/152; 108/44

[56] References Cited

U.S. PATENT DOCUMENTS

| | | | |
|---|---|---|---|
| 1,953,084 | 4/1934 | Lim | 296/26 |
| 4,433,865 | 2/1984 | Crompton, Jr. | 296/180.4 X |
| 5,064,335 | 11/1991 | Bergeron et al. | 296/26 X |
| 5,087,091 | 2/1992 | Madill | 296/26 |

Primary Examiner—Joseph D. Pape

[57] ABSTRACT

Improvements for increasing the cargo-carrying capacity of a van of a type having a body with right and left pivotally hinged doors comprising a door-bracing panel for supporting additional cargo operatively disposed to hold open the right and left doors in spaced apart relation extending rearwardly of the body and an additional tail light on a cooperating edge of each of the doors in facing relation to an oncoming motorist to permit safe operation of the van while allowing the transport of additional cargo on the platform between the open doors.

1 Claim, 2 Drawing Sheets

INDUSTRIAL VAN WITH INCREASED CARGO-CARRYING CAPACITY

The present invention relates generally to improvements for an industrial van, said improvements more particularly providing the operator of the van the option of significantly increasing the cargo-carrying capacity of the van.

Example Of The Prior Art

In U.S. Pat. No. 5,064,335 entitled "Apparatus For Handling Cargo" issued to Bergeron et al. on Nov. 12, 1991, a platform extends rearwardly of the floor of an industrial van to provide support for additional cargo. Such rearwardly extending weight-supporting platforms of the noted and all other known prior patents are typically themselves supported as a cantilever structure, which limits the weight that can be supported on these platforms.

Broadly, it is an object of the present invention to provide a weight-supporting platform positioned at the rear of an industrial van overcoming the foregoing and other shortcomings of the prior art.

More specifically, it is an object to embody the added cargo platform with side supports, rather than as a cantilever extension of the floor of the van, to thereby contribute to a significant increase in the weight that the platform is capable of supporting. Moreover, the support provided along the sides of the platform results from advantageous use of original equipment manufacture structural features of the van, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

Figure 1:
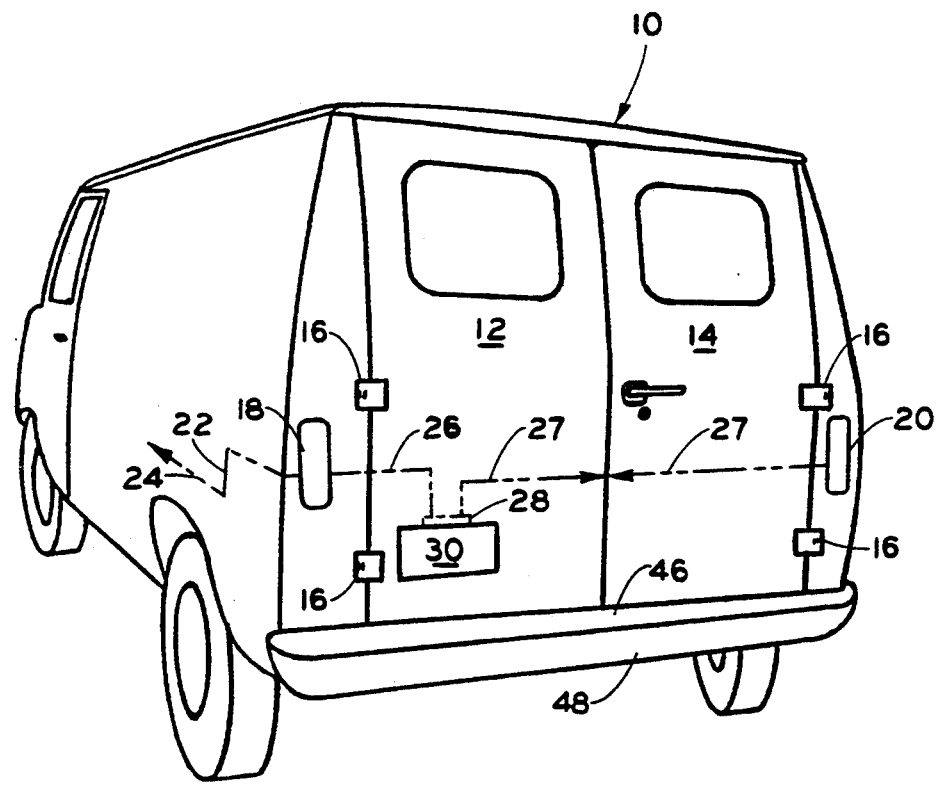
FIG. 1 is a rear perspective view of an industrial van.

As generally understood, and as shown in FIG. 1, an industrial van 10 has rear left 12 and right 14 doors mounted on hinges 16 and includes a rear display outwardly thereof of left and right side rear or so-called tail lights 18 and 20 electrically connected by circuitry 22 to the van battery, as noted by the arrow reference line 24. A part of the circuitry 22 includes an electrical connection 26 to illumination 28 for a displayed license plate 30.

Figure 2:
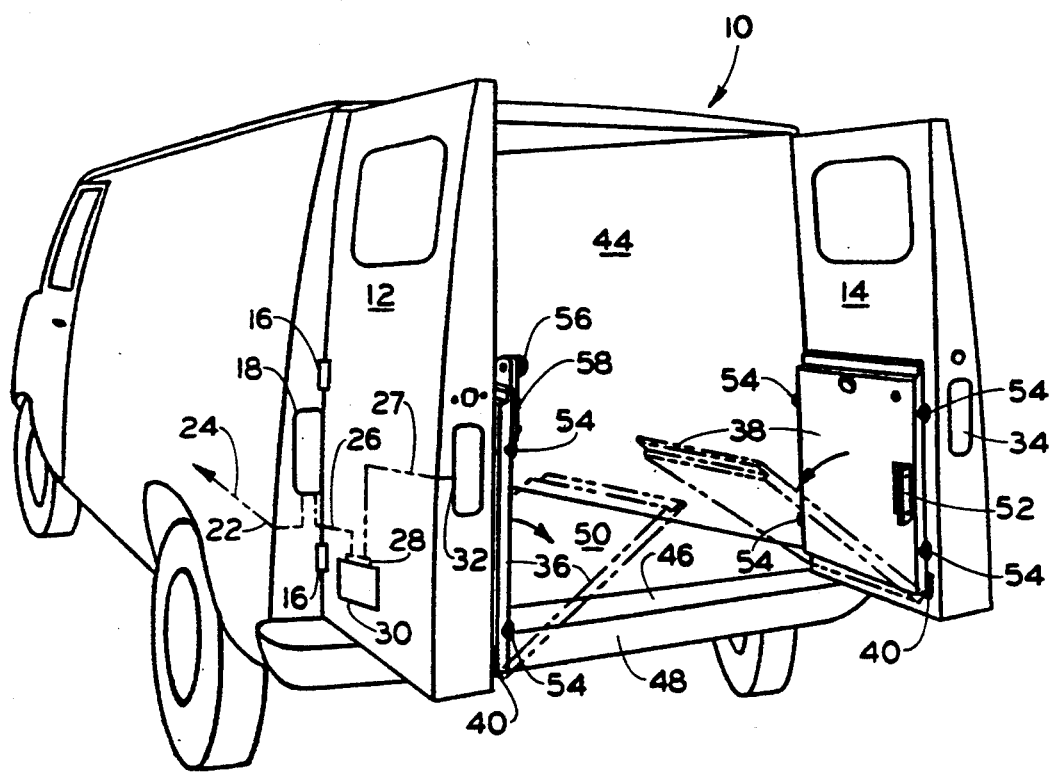
FIG. 2 is likewise a rear perspective view, but illustrating the rear doors in an open condition and the positions of movement of a cargo-supporting platform in full line and phantom line perspective.
Figure 3:
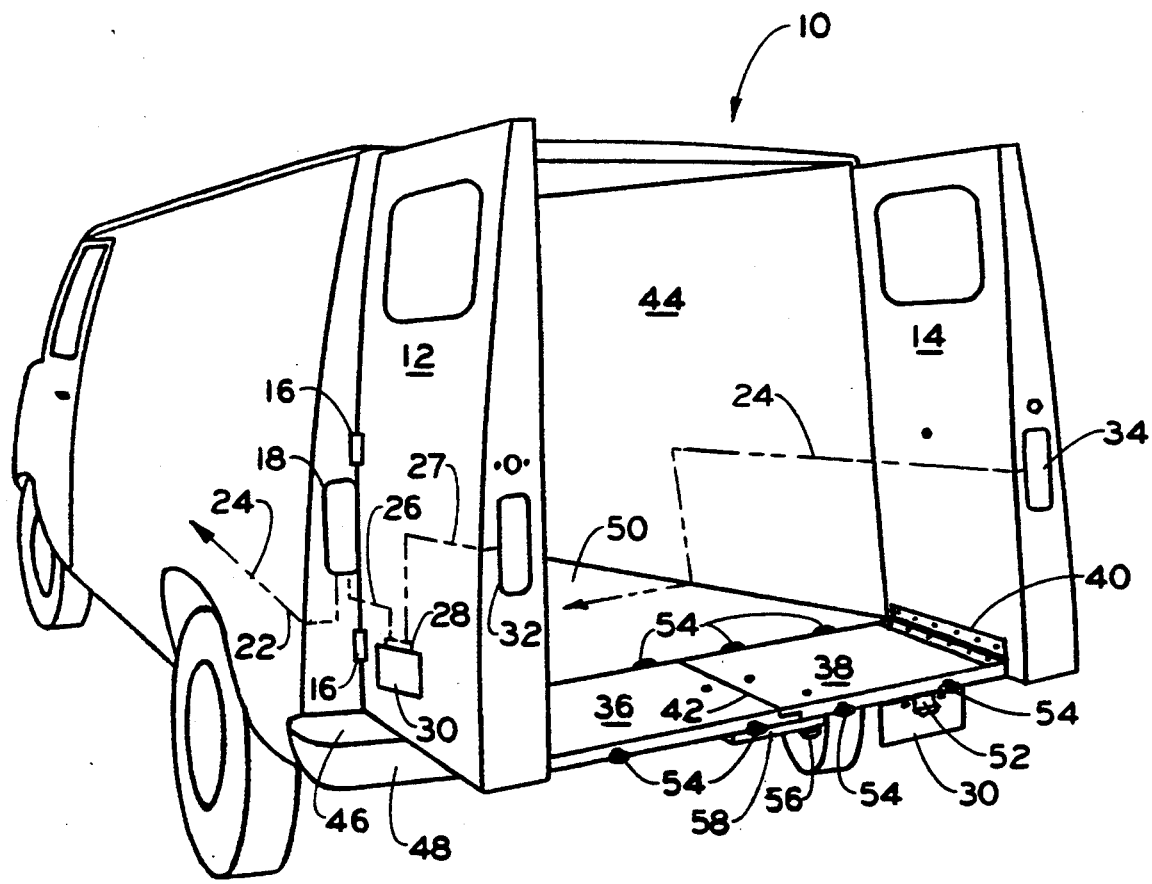
FIG. 3 is likewise a rear perspective view, and illustrates the cargo-supporting platform in its operative position in spanning relation between the open rear doors.

The present invention is concerned with providing an option to increase the cargo-carrying capacity of the van, as will be better understood as the description proceeds. However, to provide this option, and still referring to FIG. 1, it will be understood that electrical circuitry 27 from the license plate illumination 28 and from the rear right side light 20, respectively, is used to advantage to illuminate during night time travel auxiliary rear left and right lights 32 and 34, as shown in FIGS. 2 and 3 since, in the open condition of the doors 12 and 14, the original equipment manufacture (OEM) lights 18 and 20 are obscured by the open doors 12 and 14 to an approaching motorist. That is, a motorist approaching from the rear in the same lane being used by the van 10 will see the OEM lights 18 and 20. However, to a motorist approaching and passing in the left lane, the right OEM tail light 20 will be obscured by the rearwardly extending right door 14, and similarly to a motorist approaching and passing in the right lane, the left OEM tail light 18 will be obscured by the rearwardly extending left door 12. Thus, the additional lights 32 and 34 are provided, in accordance with the present invention, to comply with vehicle operation traffic regulations.

Referring to FIGS. 2 and 3, to further implement the option, cargo-supporting platforms 36 and 38 are hingedly mounted, as at 40, to each of the doors 12 and 14, so as to partake of a pivotal traverse, as noted by the full line and phantom line perspective of the platforms 36, 38, from upright positions held adjacent each door 12, 14 by releasable spring clamps or other appropriate means, into engaged positions, as at 42, in spanning relation between the doors 12 and 14. The interengaged platforms 36, 38 thus maintain the doors 12, 14 in their opens condition and also are a rearward extension of the OEM cargo area 44 of the van 10. Supporting the platforms 36, 38 from below, is a flat section 46 of the rear bumper 48, but if the model industrial van is lacking this type bumper, a rearward support (not shown) connected to extend from the van floor 50 and disposed beneath the platforms 36, 38, or other appropriate support structure, are contemplated substitutes for the described bumper support 46.

For completeness' sake, it is noted that the open-door condition dictates that for the OEM license plate position, the license plate 30 is instead suspended at 52 from a depending platform bracket, that eye bolts 54 (FIG. 3) are provided for connection to hooks of bunge cords or the like, as may be necessary to lash down the additional cargo supported on the interconnected platforms 36 and 38, and that captive thumb screws 56 are threadable in cooperating threaded bores to supplement the interconnection of the platforms 36 and 38 by attaching to the underside of the platforms 36, 38 at their juncture a platform joiner 58.

While the apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. Improvements for increasing the cargo-carrying capacity of a van of a type having a body with right and left pivotally hinged doors and tail lights displayed to an oncoming motorist located outwardly of a hinge axis of said right and left doors illuminated by a battery of said van, said improvements comprising door-bracing means operatively disposed to hold open said right and left doors in spaced apart relation extending rearwardly of said body, said spaced apart open positions of said doors being of an extent inadvertently masking the display of said tail lights to an oncoming motorist, a component of said door-bracing means consisting of a weight-supporting platform horizontally oriented in spanning relation between said braced-apart doors, an additional tail light on a cooperating edge of each of said doors in facing relation to an oncoming motorist, and circuit means connected from a battery of said van effective to illuminate said additional tail lights, whereby an illuminated mode of said additional tail lights contributes to safe operation of said van while allowing the transport of additional cargo on said platform between said open doors.

* * * * *